United States Patent [19]

Kale

[11] Patent Number: 4,949,680
[45] Date of Patent: Aug. 21, 1990

[54] WATER HEATER HAVING FILLING DIP TUBE

[76] Inventor: Hemant D. Kale, 5145 North Kenton, Chicago, Ill. 60630

[21] Appl. No.: 299,136

[22] Filed: Jan. 23, 1989

[51] Int. Cl.$^5$ .............................................. F22B 5/00
[52] U.S. Cl. ................................... 122/17; 122/13.1; 122/13.2; 126/361
[58] Field of Search .................... 122/13 R, 13 A, 17; 126/361

[56] References Cited

U.S. PATENT DOCUMENTS

| | | | |
|---|---|---|---|
| 1,944,817 | 1/1934 | Thomas | 122/13 R |
| 2,698,007 | 12/1954 | Tegler | 122/13 R |
| 2,708,914 | 5/1955 | Cooper | 122/13 R |
| 3,465,123 | 9/1969 | Harris | 122/13 R X |
| 4,549,525 | 10/1985 | Harang | 122/13 R X |

Primary Examiner—Edwards G. Favors
Attorney, Agent, or Firm—John C. Shepard

[57] ABSTRACT

A hot water heater having a vertical, cylindrical tank with a curved top wall, means for heating water within the tank, a cold water inlet and a hot water outlet at the top includes an inlet dip tube disposed along the central vertical axis of the tank for foiling internal thermal convection currents rising along the center of the tank and minimizing the mixing of hot and cold water so that the temperature of hot water delivered at the outlet remains relatively constant over time.

12 Claims, 4 Drawing Sheets

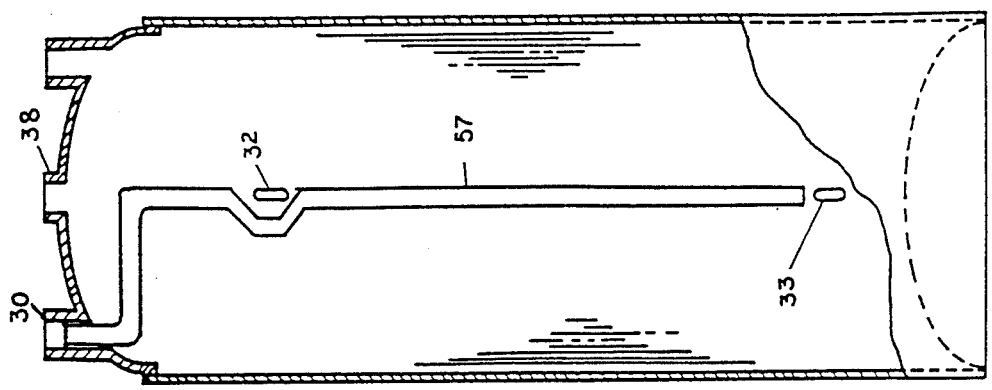
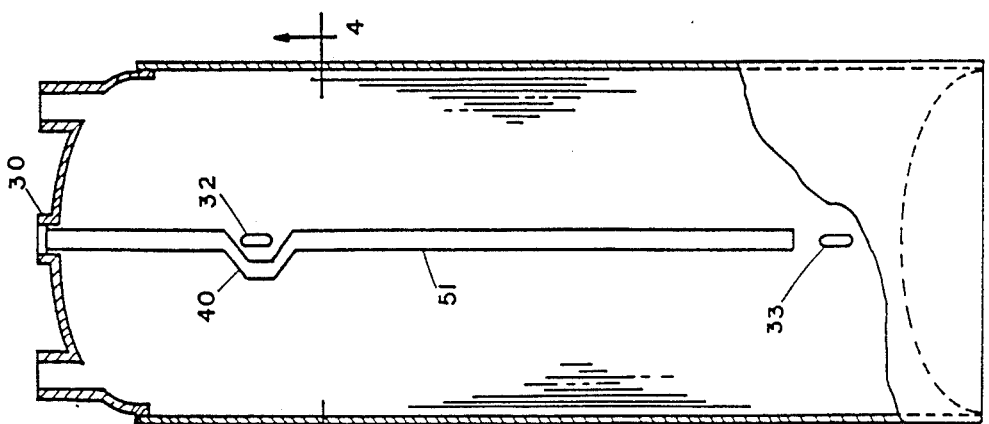
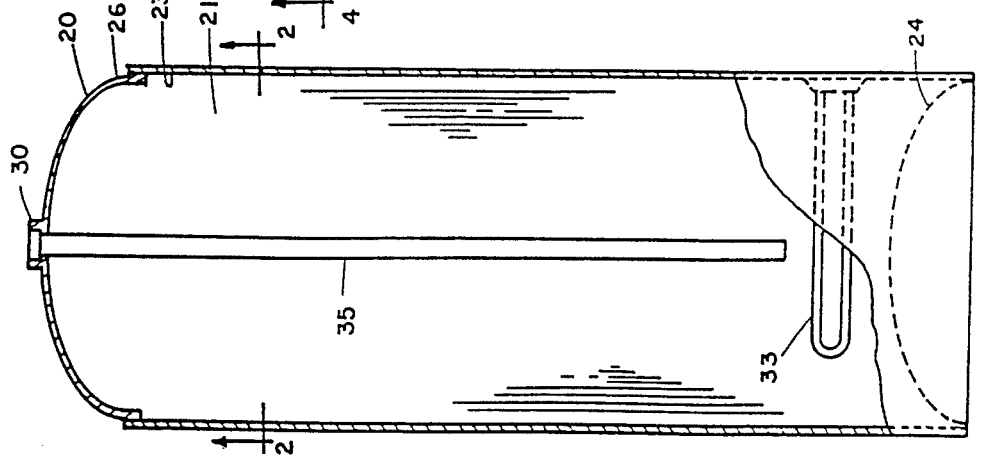

WATER HEATER HAVING FILLING DIP TUBE

BACKGROUND OF THE INVENTION

1. Technical Field

This invention relates generally to heating appliances such as storage-tank type hot water heaters with tank diameters between 12 to 26 inches and, more particularly, to the disposition of the inlet dip tube.

2. Background Art

In the prior art, a storage-tank water heater replaces hot water withdrawn from the top of the tank with cold water delivered to the bottom of the tank. Because typical tank heating elements cannot heat the water as fast as it is withdrawn, cold water will eventually fill the tank. Even before the tank is filled with cold water, the incoming cold water mixes freely with the heated standing water in the tank thereby causing deterioration of the tank's water temperature. This mixing is partially the result of the convection currents established within the tank. The storage tank in these heaters generally has a diameter between 12 and 26 inches.

Because of this mixing, hot water delivered by a typical hot water heater will gradually decrease in temperature while water is being withdrawn, only a small amount of high temperature water is delivered relative to the tanks total capacity. The hot water delivered to the outlet above a specified temperature can obviously be extended by increasing the size of the tank or by increasing the BTU input of the heating elements or gas/oil burner. The temperature of hot water at the outlet can also be maintained by preventing the mixing of hot and cold water within the tank.

Attempts have been made in the past to contain and control the mixing of hot and cold water by providing separate chambers within the tank for cold and hot water. Miller U.S. Pat. Nos. 2,833,273 and 3,244,166 employ separate chambers within the tank at the inlet. Gulick U.S. Pat. No. 2,207,057 uses a small baffle over the inlet to control mixing. Fox U.S. Pat. No. 787,909 shows the use of a movable barrier. In substantially different constructions employing the concept of compartmentalization, Jacoby U.S. Pat. No. 2,625,138 divides the tank into a plurality of separate vertical layers by using numerous horizontal baffles and Pruitt U.S. Pat. No. 2,311,469 shows a burner in which several secondary combustion chambers stratify the water in the storage tank.

While these prior art designs tried to reduce flow created by the usual high velocity of incoming cold water and tried to separate hot and cold water layers, none have taken note of the existence of possible convection currents and, thus, none limit the formation of these thermal currents in the tank and preserve the smooth horizontal boundry layer between hot and cold water within the tank. Further, these convection thermal currents are believed to flow primarily along the smooth side surfaces of the tank and are enhanced by the smooth inner surface of the curved top, the "domed" top being common in pressure tanks because of their structural strength. These closed loop currents greatly enhance the mixing of hot and cold water. My U.S. Pat. Nos. 4,632,065 and 4,739,728 attempt to stop mixing caused by these convection currents.

In these patents the mixing is prevented in a more active manner by presenting a physical obstruction to the convection currents. It requires new components to be added to the tank construction. Whereas, the invention disclosed herein prevents mixing in a more passive manner by simply rearranging the same components. This is novel, unique and very cost effective.

In the earlier storage-tank type water heater designs, the incoming cold water was introduced in the bottom of the tank through a side inlet also located adjacent to the bottom of the tank. This was done to maintain maximum physical separation between the incoming cold water and the heated water. Later, for the sake of installation convenience, the side inlet was replaced by a top inlet. The top inlet allows installation in more confined spaces, because it provides easier access to pipe connections. However, to prevent the ready and spontaneous mixing that will occur with the top inlet, a thermoplastic dip tube is used which introduces water into the tank in approximately the same area as before, namely, at the bottom of the tank. The location of the dip tube was always and of necessity off-center, because the exhaust gas flue occupied the central location in gas and oil heaters and the heating elements occupied this space in electric water heaters. At present, the dip tube is spaced 4 inches from the central vertical axis. These dip tubes are made of plastic material which is susceptible to deformation and other damage under high temperature conditions that can occur under a "dry heat" condition. "Dry heat" damage occurs when the dip tube is not submerged in water as it would be under normal conditions. A "dry heat" condition can occur when the heater is inadvertently turned on without first completely filling the tank with water. In addition to the problem posed by the flue or the heating elements occupying the central space, to avoid this problem, the dip tube was always placed off-center to maintain a physical distance from the centrally located heating elements. However, in an off-center location, the dip tube does not effectively counter uprising convection currents since they are located at the center of the tank.

There is another problem commonly associated with gas and oil water heaters. Frequent withdrawals of small quantities of hot water causes frequent firing of the gas/oil burner. With each firing of the burner, the temperature of the water overshoots the thermostat setting. This overheated water rises and accumulates at the top. This phenonmenon is sometimes referred to as "stacking". Since the thermostat is located in the bottom of the heater, the temperature of the water in the top can become dangerously high. To alleviate this problem, present water heaters use dip tubes which terminate above the bottom of the tank about ⅓rd of the way up. Some heaters use a dip tube design which partially introduces incoming cold water in the upper portion of the tank to moderate the excessively high water temperature. To accomplish this, the dip tube is provided with a hole which opens or closes in response to the temperature of the surrounding water. Both these solutions have an adverse effect on the recovery rating of the heater. The invention disclosed herein can provide a solution to the "stacking" problem without adversely effecting the recovery rate.

SUMMARY OF THE INVENTION

The present invention is directed to overcoming one or more of the problems as set forth above.

According to the present invention, a conventional hot water heater having a vertical tank with curved top wall has an inlet water dip tube disposed in a manner that will effectively foil internal thermal convection currents rising along the center vertical axis of the tank while maintaining the existence of a smooth boundry layer between the hot and cold water within the tank.

In one exemplary embodiment of the invention, the inlet dip tube is brought into the tank at the center point of the tank top and is disposed along the center vertical axis of the tank. The cold current flowing inside the tube causes rapid cooling of the hot water adjacent to the external dip tube surface. This cooling tends to generate downward currents which counter the uprising currents, thereby foiling same.

A feature of the invention is that the heater will deliver more hot water, in gallons, at a relatively steady temperature. A further feature of the invention is the minimization of the mixing of hot and cold water within a water heater by the simpliest and least expensive means possible.

Another feature of the invention is that the temperature of hot water delivered at the outlet is held relatively constant without the use of means for stratifying or compartmentalizing the heater tank.

BRIEF DESCRIPTION OF THE DRAWINGS

The details of construction and operation of the invention are more fully described with reference to the accompanying drawings which form a part hereof and in which like numerals refer to like parts throughout.

In the drawings:

FIG. 1 is a side elevational view, partially in section, of a first embodiment of a hot water heater constructed in accordance with the present invention employing an inlet dip tube.

FIG. 3 is a side elevational view, partially in section, of a second embodiment of the present invention showing disposition of the dip tube when a plurality of heating elements are encountered.

FIG. 5 is a side elevational view, partially in section, of an alternate dip tube construction.

DESCRIPTION OF THE PREFERRED EMBODIMENTS

Best Modes for Carrying Out The Invention

Figure 2:
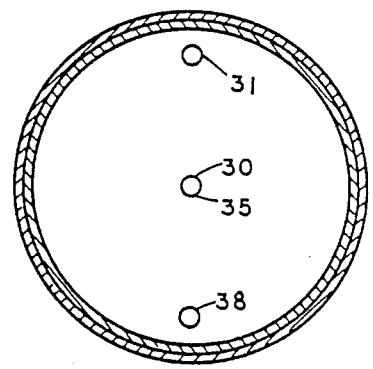
FIG. 2 is a cross-sectional view of the heater taken along line 2—2 of FIG. 1.

Referring to FIGS. 1 and 2 of the drawings, a conventional, non-compartmentalized hot water heater, generally designated 20, has a storage tank 21 with an upright, vertical central axis. The tank 21 is defined by a cylindrical side wall 23, a bottom wall 24 and an outwardly concave top wall 26. The storage tank 21 has smooth internal walls and, in the upper portion thereof, its interior is open and free of obstructions. The tank 21 has a cold water inlet 30 and a hot water outlet 31 generally adjacent the top thereof. As shown herein, electric heating element 33 heats the water within the tank. The tank 21 may also have an opening 38 for a temperature-pressure relief valve.

When the heater 20 is in operation, hot water is withdrawn from the top of the tank 21 by way of the outlet 31. Cold water replacing the water withdrawn enters by way of the inlet dip tube 35.

Figure 4:
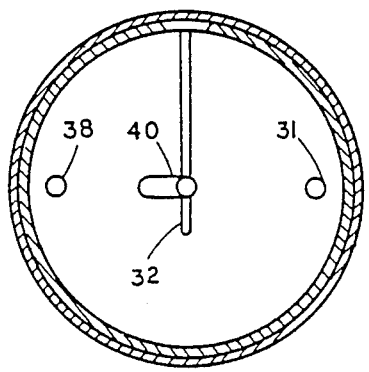
FIG. 4 is a cross-sectional view of the heater taken along line 4—4 of FIG. 3.
Figure 13:
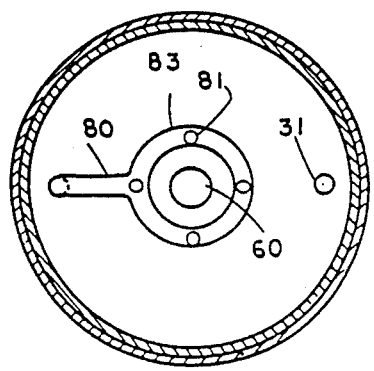
FIG. 13 is a cross sectional view of the heater taken along line 5—5 of FIG. 12.

In a first embodiment of the invention as shown in FIGS. 1 and 2, the inlet dip tube 35 enters the tank at the top center point and is disposed on the central vertical axis of the tank. The dip tube 35 may be made of metal or other suitable material. The incoming cold water flowing inside the dip tube 35 cools the hot water adjacent to the outside surface of the dip tube. This cooling generates downward current which counters uprising currents. This foils the closed loop convection currents that otherwise will establish within the tank 21, thereby minimizing mixing of cold and hot water and the resultant temperature equalization within the tank 21. In a second embodiment of the invention shown in FIGS. 3 and 4, the dip tube 51 extends from an inlet at the center of the top wall, incorporates a bend 40 to allow room for an upper heating element 32 and terminates at a point above a lower heating element 33.

In a third embodiment as shown in the FIG. 5, the dip tube 57 enters the tank at any convenient point adjacent to the top but remains disposed on the central vertical axis of the tank for a substantial portion of its length.

Figure 6:
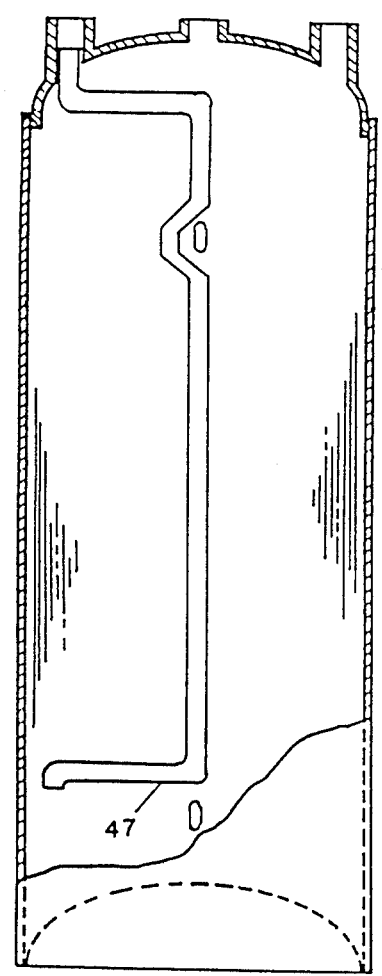
FIG. 6 is a side elevational view, partially in section, of an alternate dip tube construction.

In a fourth embodiment as shown in FIG. 6, the dip tube 47 enters at convenient point adjacent to the top, remains disposed substantially on the central vertical axis of the tank, and deposits cold inlet water at the bottom of the tank periphery adjacent the side wall.

Figure 7:
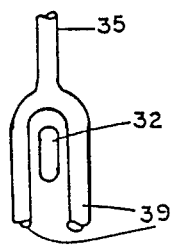
FIG. 7 is a partial side elevational view of an alternate dip tube construction.

In FIG. 7, a different design of the dip tube 35 is shown. This design splits in two branches 39 to allow room for the heating element 32 and at the same time effectively foils thermal convection currents on both sides of the heating element.

Figure 8:
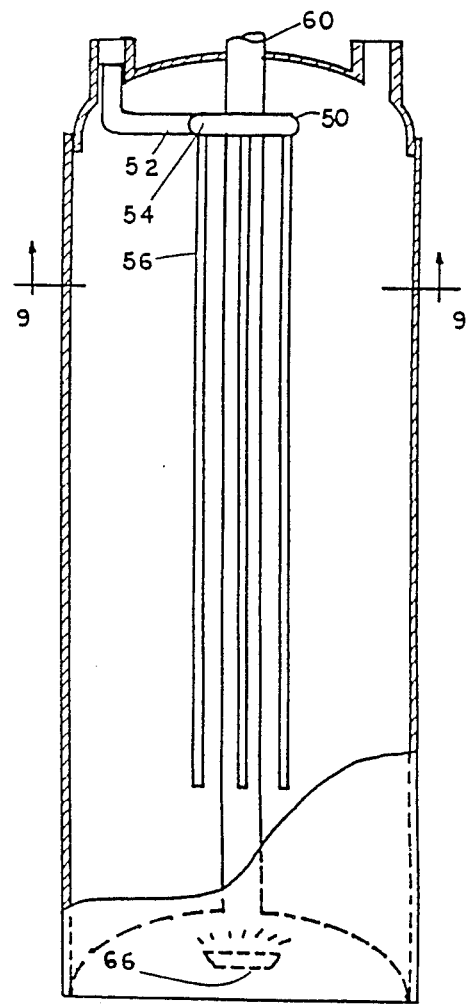
FIG. 8 is a side elevational view, partially in section, of a gas water heater using the present invention.
Figure 9:
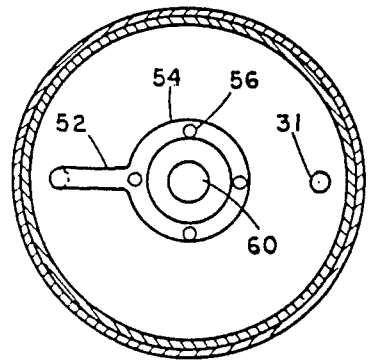
FIG. 9 is a cross-sectional view of the heater taken along line 9—9 of FIG. 8.

A gas/oil water heater employing this invention is shown in FIGS. 8 and 9. This heater employs a dip tube assembly 50. The dip tube assembly 50 comprises a primary dip tube 52, a manifold 54, and a plurality of secondary dip tubes 56. Preferably, the secondary dip tubes 56 are located at equal distances from each other and from the surface of the main flue 60 to more effectively foil the convection currents rising on all sides of the flue in a more balanced and effective manner. It should be understood that material, size, shape and quantity of dip tubes installed may vary to suit the application and to obtain optimum results.

Figure 10:
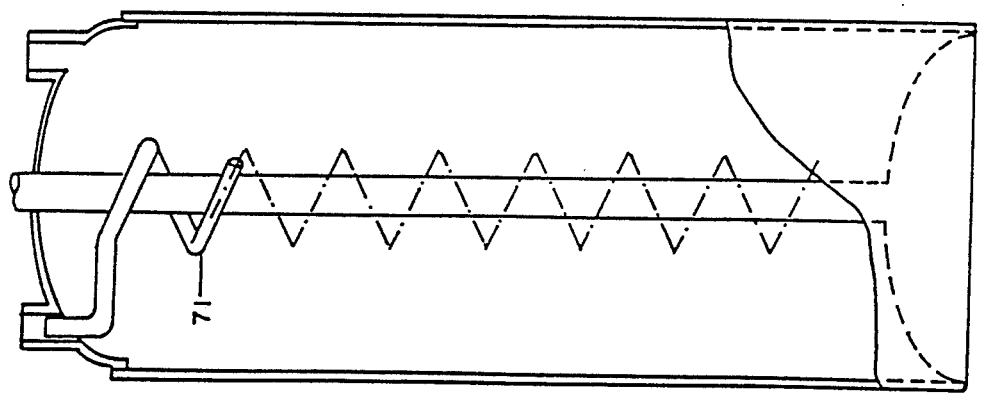
FIG. 10 is a side elevational view, partially in section, of an alternate dip tube construction.

In FIG. 10, yet another design of dip tube 71 is shown. In this design, the dip tube spirals down around the central vertical axis to foil the convection currents.

Figure 11:
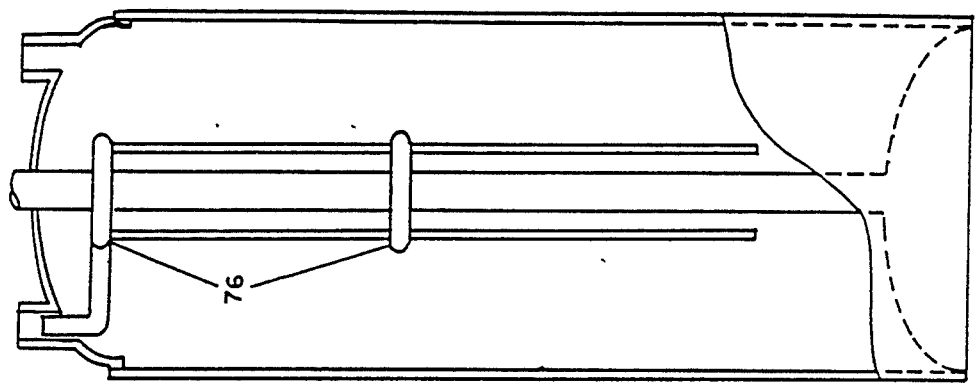
FIG. 11 is a side elevational view, partially in section, of an alternate dip tube construction.

In FIG. 11, the use of multiple manifolds 76 to effectively foil the thermal currents is illustrated.

Figure 12:
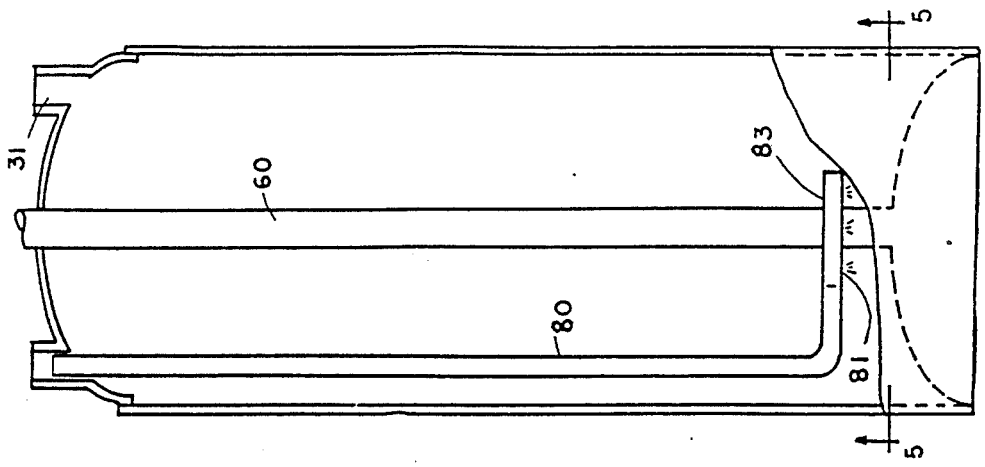
FIG. 12 is a side elevational view, partially in section, of an alternate dip tube construction.

In FIG. 12, a further design of dip tube is shown. In this design, the dip tube 80 turns around the central vertical axis. Several openings 81, which vent incoming water downward, are provided in the horizontal portion 83 of the dip tube. The water coming out of the openings 81 counter the upward convection currents in that area thereby foiling the larger currents.

Figure 14:
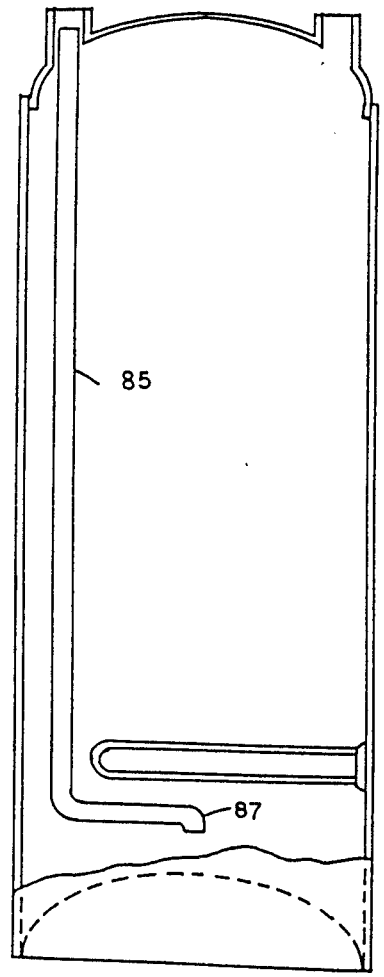
FIG. 14 is a side elevational view, partially in section, of an alternate dip tube construction.

In FIG. 14, the dip tube 85 has an outlet 87 which vents downward and is located within 3 ½ inches of the central vertical axis of the tank. The water coming out of outlet 87 counters the upward moving convection currents in this area.

The embodiments shown in FIGS. 8,9,10,11,12 and 13 can also be used in electric water heaters which do not employ an an exhaust gas flue 60. These embodiments may be more effective, particularly, in heaters with large diameter tanks.

In those embodiments of the invention where a single, straight dip tube, free of secondary tubes or manifolds, is used, the dip tube is located not more than 3 ½ inches from the tank's central vertical axis.

Industrial Applicability

From the foregoing it should be apparent that the hot water heater described herein is simple and inexpensive, yet provides a convenient and reliable means for delivering more hot water from the tank outlet at a relatively constant temperature for a sustained period of time.

Other aspects, objects and advantages of this invention can be obtained from a study of the drawings, the disclosure and the appended claims.

What is claimed is:

1. In a heater having a pressurized vertical storage tank defined by a cylindrical side wall having a diameter between 12 and 26 inches, a bottom wall and a curved top wall and having a non-compartmentalized internal storage area, means for heating water within the tank, a cold water inlet and a hot water outlet generally adjacent the top thereof, the improvement comprising an inlet dip tube entirely within the storage area of the tank for delivering water from the inlet to the tank interior, said dip tube extending downwardly to a position in the bottom portion of said tank and being disposed not more than 3 ½ inches from the vertical central axis of said tank, said dip tube incorporating a bend to allow room for a heating element extending into the area of said vertical axis.

2. In a heater having a pressurized vertical storage tank defined by a cylindrical side wall having a diameter between 12 and 26 inches, a bottom wall and a curved top wall and having a non-compartmentalized internal storage area, means for heating water within the tank, a cold water inlet and a hot water outlet generally adjacent the top thereof, the improvement comprising an inlet dip tube entirely within the storage area of the tank for delivering water from the inlet to the tank interior, said dip tube extending downwardly to a position in the bottom portion of said tank and being disposed not more than 3 ½ inches from the vertical central axis of said tank, the heater having upper and lower heating elements, and said dip tube extending downwardly from said inlet on said vertical axis, bending around said upper heating element and terminating at a position above said lower heating element.

3. In a heater having a pressurized vertical storage tank defined by a cylindrical side wall having a diameter between 12 and 26 inches, a bottom wall and a curved top wall and a having a non-compartmentalized internal storage area, means for heating water within the tank, a cold water inlet and a hot water outlet generally adjacent the top thereof, the improvement comprising an inlet dip tube entirely within the storage area of the tank for delivering water from the inlet to the tank interior, said dip tube extending downwardly to a position in the bottom portion of said tank and being disposed not more than 3 ½ inches from the vertical central axis of said tank, said inlet being spaced from said vertical axis and said dip tube extends from said inlet inwardly towards said vertical axis and then downwardly along said vertical axis.

4. In a heater having a pressurized vertical storage tank defined by a cylindrical side wall having a diameter between 12 and 26 inches, a bottom wall and a curved top wall and having a non-compartmentalized internal storage area, means for heating water within the tank, a cold water inlet and a hot water outlet generally adjacent the top thereof, the improvement comprising an inlet dip tube entirely within the storage area of the tank for delivering water from the inlet to the tank interior, said dip tube extending downwardly to a position in the bottom portion of said tank, said dip tube extending from said inlet and including a plurality of secondary tubes, said secondary tubes extending downwardly adjacent said vertical axis to a position in the bottom portion of said tank, the heater including a flue and said secondary dip tubes being disposed around and not more than 3 ½ inches from said flue.

5. In a heater having a pressurized vertical storage tank defined by a cylindrical side wall having a diameter between 12 and 26 inches, a bottom wall and a curved top wall and having a non-compartmentalized internal storage area, means for heating water within the tank, a cold water inlet and a hot water outlet generally adjacent the top thereof, the improvement comprising an inlet dip tube entirely within the storage area of the tank for delivering water from the inlet to the tank interior, said dip tube including at least one secondary tube extending downwardly to a position in the bottom portion of the tank, said secondary tubes being disposed around the central vertical axis of the tank, said dip tube including a dip tube manifold connected to said inlet and said secondary dip tubes extending downwardly from said manifold and being disposed around said vertical axis.

6. The heater of claim 5 wherein the heater includes a flue, said secondary dip tubes are disposed around said flue, and said flue extends through said manifold.

7. The heater of claim 5 further including a second dip tube manifold below said first manifold, the secondary tubes of said first manifold extending into said second manifold.

8. In a water heater having a pressurized vertical storage tank defined by a cylindrical side wall having a diameter between 12 and 26 inches, a bottom wall and a curved top wall and having a non-compartmentalized internal storage area, means for heating water within the tank, a cold water inlet and a hot water outlet generally adjacent the top thereof, the improvement comprising an inlet dip tube assembly entirely within the storage area of the tank disposed substantially along the vertical axis of the tank, said assembly including a primary dip tube, a dip tube manifold connected to said inlet by said primary dip tube, and a plurality of secondary dip tubes extending downwardly from said manifold and disposed around the central vertical axis of the tank.

9. In a water heater having a pressurized vertical storage tank defined by a cylindrical side wall having a diameter between 12 and 26 inches, a bottom wall and a curved top wall and having a non-compartmentalized internal storage area, means for heating water within the tank, a cold water inlet and a hot water outlet generally adjacent the top thereof, the improvement comprising an inlet dip tube entirely within the storage area of the tank for delivering water from the inlet to the tank interior, said dip tube extending spirally downward, the vertical central axis of the spiral being substantially parallel to the vertical central axis of the tank.

10. The heater of claim 9 wherein the tank includes a central exhaust flue and said dip tube spirals around the flue.

11. The heater of claim 9 wherein the central vertical axis of the spiral is located no more than 3 ½ inches from the vertical central axis of the tank.

12. The heater of claim 9 wherein said dip tube spirals at least 360 degrees.

* * * * *